(No Model.)
C. H. WATSON.
VALVE FOR HYDRANTS.
No. 518,475. Patented Apr. 17, 1894.
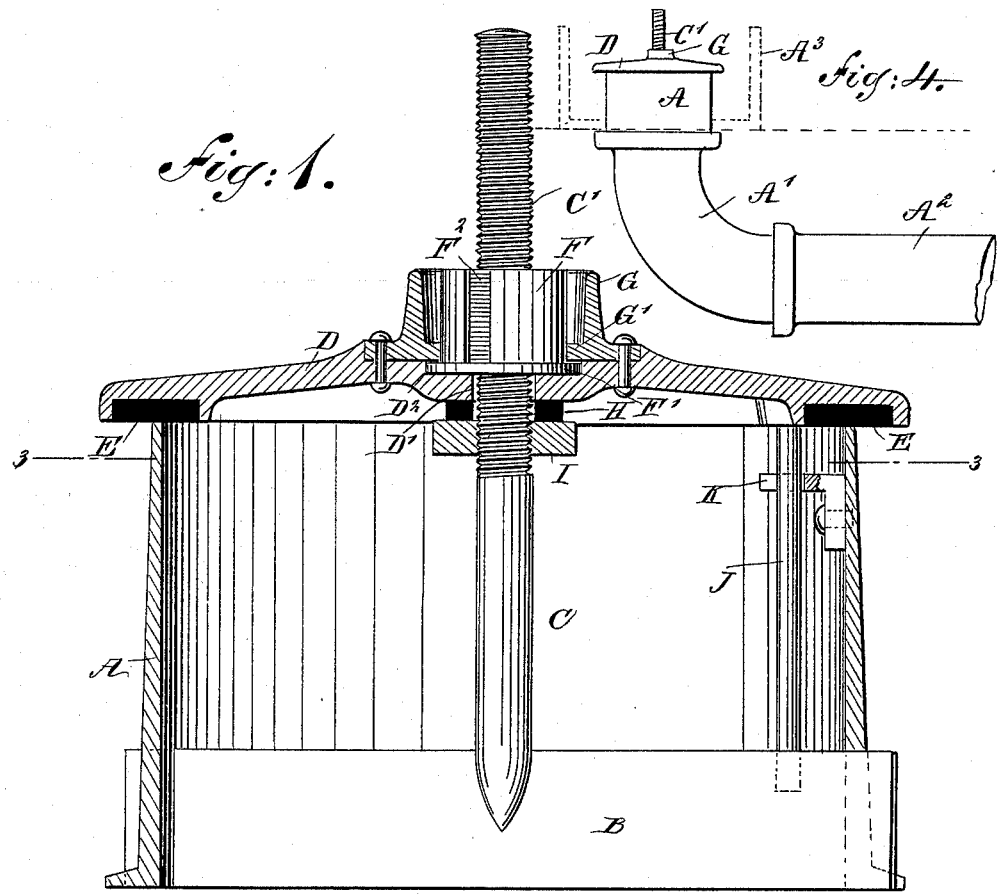
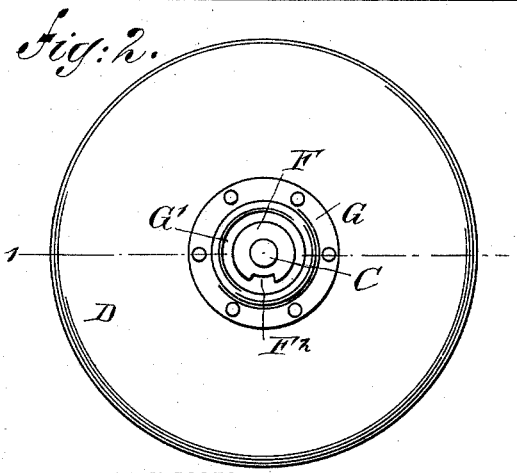
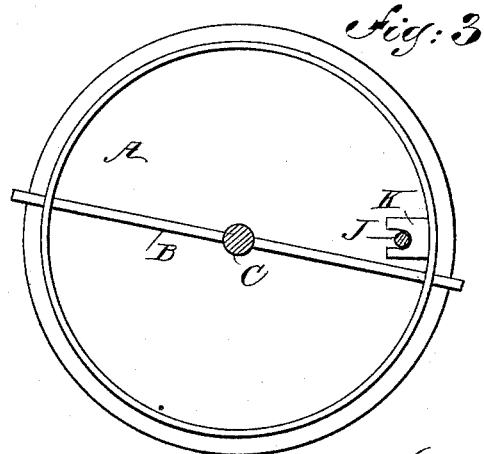
WITNESSES:
Chas Nida.
C. Sedgwick
INVENTOR
C. H. Watson
BY
Munn & Co.
ATTORNEYS.

UNITED STATES PATENT OFFICE.

CHRISTOPHER H. WATSON, OF RIVERSIDE, CALIFORNIA.

VALVE FOR HYDRANTS.

SPECIFICATION forming part of Letters Patent No. 518,475, dated April 17, 1894.

Application filed August 18, 1893. Serial No. 483,593. (No model.)

*To all whom it may concern:*

Be it known that I, CHRISTOPHER H. WATSON, of Riverside, in the county of Riverside and State of California, have invented certain new and useful Improvements in Valves for Hydrants, of which the following is a full, clear, and exact description.

The invention relates to hydrant valves used in connection with a measuring box, for irrigating purposes.

The object of the invention is to provide certain new and useful improvements in hydrants, whereby the flow of the water from the supply pipe to the measuring box, can be conveniently regulated according to the amount of water required for a certain purpose.

The invention consists of certain parts and details, and combinations of the same, as will be hereinafter described, and then pointed out in the claims.

Reference is to be had to the accompanying drawings, forming a part of this specification, in which similar letters of reference indicate corresponding parts in all the figures.

Figure 1 is a sectional side elevation of the improvement on the line 1—1 of Fig. 2. Fig. 2 is a reduced plan view of the same. Fig. 3 is a reduced sectional plan view on the line 3—3 of Fig. 1; and Fig. 4 is a reduced side elevation of the improvement as applied.

The casing A is fitted at its lower end in the elbow A' of the supply pipe A² and is cemented or otherwise fastened in said elbow, see Fig. 4. The casing A extends above ground and is inclosed in a measuring box A³ (see dotted lines Fig. 4) into which the water flows to be measured when the hydrant is opened. In the lower end of the casing A is arranged the diametrically-extending bar B, provided with a vertically-disposed rod C, extending centrally through the casing, as plainly illustrated in the drawings.

The upper threaded end C' of the rod C extends through an aperture D', formed centrally in the cover D, supporting on its under side, a rubber ring E, adapted to engage the upper edge of the casing A, so as to securely close the latter. In the middle of the cover D and on the top thereof is a circular recess having two shoulders, or ledges. The inner and deeper portion, D², of such recess forms a seat for the flanged base, F', of a rotatable nut, F, which works on the threaded portion, C', of the rod, C. An annular collar, G, fits in the larger portion of the aforesaid recess, and its inwardly-projecting flange overlaps the flange, F', of nut, F. The collar, G, being fixed, that is to say riveted, to the cover, D, it is apparent that the nut, F, is also secured thereto, but free to rotate as required.

In the side of the nut F is arranged a recess F², adapted to be engaged by a suitable projection on a wrench or other tool used for turning the said nut F in its bearings in the cover D, so as to raise or lower the latter according to the direction in which the said nut is turned. The under side of the cover D is engaged at its middle by a gasket H, pressed on at the under side by a nut I, screwing on the threaded part of the rod C, so as to form, with said gasket H, a tight joint at the aperture D' through which the rod C passes. On the under side of the cover D is also secured the downwardly-extending rod J, engaging the forked end of a keeper K, attached to the casing A at the inside thereof. This rod J prevents the cover D from turning when raising or lowering the same on turning the nut F, it being understood that the rod J moves with the cover, as it fully engages the forked end of the keeper K.

The operation is as follows: When the several parts are in the position illustrated in Fig. 1, the cover D is seated on the upper end of the casing A, so that the water from the latter may not escape, and the casing A is closed. Now, when it is desired to permit water to flow from the supply to the measuring box or other device, then the operator applies a key, wrench or other suitable tool on the nut F to turn the same in its bearings in the cover D, so that the nut rises on the threaded end C' of the fixed rod C, thereby carrying the cover D in the same direction. The upward movement of the cover D unseats the ring E from the upper edge of the casing A, so as to permit the water to flow out of the latter at its now open upper end to the measuring box A³ or other device. It is understood that by turning the nut F, the cover D can be raised any desired distance above the casing A so as to regulate the amount of water passing out at the upper end of the casing.

Having thus fully described my invention, I claim as new and desire to secure by Letters Patent—

A hydrant valve, comprising a screw rod held on a bar attached to the casing, a cover through which passes the said screw rod, a nut mounted to turn in bearings in the said cover and screwing on the said screw rod, means for preventing the said cover from turning, a gasket engaging the under side of the cover around the said screw rod, and a nut screwing on the screw rod and abutting against the said gasket, substantially as shown and described.

CHRISTOPHER H. WATSON.

Witnesses:
FRANK E. ABBOTT,
G. E. BITTINGER.